United States Patent
Liu et al.

(10) Patent No.: US 11,144,626 B2
(45) Date of Patent: Oct. 12, 2021

(54) AUTHORIZATION MANAGEMENT METHOD AND APPARATUS, AND ELECTRONIC DEVICE

(71) Applicants: Gree Electric Appliances (Wuhan) Co., Ltd, Hubei (CN); Gree Electric Appliances, Inc. of Zhuhai, Guangdong (CN)

(72) Inventors: Jie Liu, Guangdong (CN); Linlin Diao, Guangdong (CN); Shun Li, Guangdong (CN); Biao Xiao, Guangdong (CN)

(73) Assignees: Gree Electric Appliances (Wuhan) Co., Ltd, Wuhan (CN); Gree Electric Appliances, Inc. of Zhuhai, Zhuhai (CN)

( * ) Notice: Subject to any disclaimer, the term of this patent is extended or adjusted under 35 U.S.C. 154(b) by 85 days.

(21) Appl. No.: 16/619,160

(22) PCT Filed: Jun. 15, 2018

(86) PCT No.: PCT/CN2018/091634
§ 371 (c)(1),
(2) Date: Dec. 4, 2019

(87) PCT Pub. No.: WO2019/052244
PCT Pub. Date: Mar. 21, 2019

(65) Prior Publication Data
US 2020/0226238 A1    Jul. 16, 2020

(30) Foreign Application Priority Data
Sep. 12, 2017  (CN) .......................... 201710819219.8

(51) Int. Cl.
*G06F 21/32* (2013.01)
*G06F 1/16* (2006.01)

(52) U.S. Cl.
CPC ............ *G06F 21/32* (2013.01); *G06F 1/1652* (2013.01)

(58) Field of Classification Search
CPC .............................. G06F 21/31; G06F 1/1652
See application file for complete search history.

(56) References Cited

U.S. PATENT DOCUMENTS

2003/0071832 A1* 4/2003 Branson ................ G06F 1/1616
 345/698
2012/0235894 A1* 9/2012 Phillips .................... G09G 3/03
 345/156

(Continued)

FOREIGN PATENT DOCUMENTS

CN     10446125 A      3/2015
CN    105099985 A    11/2015
(Continued)

OTHER PUBLICATIONS

Maqsood etal, "POSTER: Passwords on Flexible Display Devices," Nov. 2013, CCS '13, ACM 978-1-4503-2477-9/13/11, (Year: 2013).*

(Continued)

*Primary Examiner* — Laurence J Lee
*Assistant Examiner* — Larry Lee
(74) *Attorney, Agent, or Firm* — McAndrews, Held & Malloy, Ltd.

(57) ABSTRACT

An authorization management method and apparatus, and an electronic device are provided. The method is applicable to a mobile terminal. A display screen of the mobile terminal is a bendable display screen and the display screen simultaneously displays an active authorization application and a passive authorization application. The method includes: monitoring whether the display screen is bent; and in a case that it is monitored that the display screen is bent, sending a first authorization confirmation instruction to the active authorization application such that the active authorization (Continued)

application provides an authorized account for the passive authorization application, and the passive authorization application acquires the authorized account from the active authorization application and performs a login through the account.

19 Claims, 8 Drawing Sheets

(56) References Cited

U.S. PATENT DOCUMENTS

| | | | |
|---|---|---|---|
| 2014/0294259 A1 | 10/2014 | Lee | |
| 2015/0347787 A1* | 12/2015 | Hamilton | G06F 21/44 726/21 |
| 2016/0026381 A1* | 1/2016 | Kim | G06F 3/04886 715/761 |
| 2016/0132683 A1 | 5/2016 | Bostick et al. | |
| 2016/0299579 A1 | 10/2016 | Kim et al. | |
| 2017/0010689 A1* | 1/2017 | Bostick | G06T 3/40 |
| 2017/0199712 A1* | 7/2017 | Lee | G01B 7/22 |
| 2018/0018929 A1* | 1/2018 | Xun | G06F 1/1626 |
| 2020/0341823 A1* | 10/2020 | Liu | G06F 3/04842 |

FOREIGN PATENT DOCUMENTS

| | | |
|---|---|---|
| CN | 105979034 A | 9/2016 |
| CN | 106503537 A | 3/2017 |
| CN | 106650351 A | 5/2017 |
| CN | 106888202 A | 6/2017 |
| CN | 206301338 U | 7/2017 |
| CN | 107704735 A | 2/2018 |

OTHER PUBLICATIONS

International Search Report, dated Sep. 18, 2018, in International application No. PCT/CN2018/091634, filed on Jun. 15, 2018.

* cited by examiner

AUTHORIZATION MANAGEMENT METHOD AND APPARATUS, AND ELECTRONIC DEVICE

CROSS REFERENCE TO RELATED APPLICATIONS

This application is a 371 of International Patent Application No. PCT/CN2018/091634, filed Jun. 15, 2018, which claims priority of Chinese Patent Application No. 201710819219.8, filed on Sep. 12, 2017, entitled "Authorization Management Method and Apparatus, and Electronic Device", the contents of both of which are hereby incorporated by reference in their entirety.

TECHNICAL FIELD

The present disclosure relates to the technical field of authority management, and particularly relates to an authorization management method and apparatus, and an electronic device.

BACKGROUND

At present, many applications of mobile terminals have their own account systems, and the account systems can not only enhance user stickiness, but also can personalize services for different users. However, applications that do not have their own account systems usually need to use other large, stable, and trusted account systems to reduce the use cost of users.

In the process of implementing the present disclosure, the inventor found that the related art has the following problems: when a third-party application needs to obtain authorization of other account systems, it is generally implemented by a jump between applications, and the process involves the jump between multiple applications, so that operations of users are complicated, and the user experience is not good enough.

SUMMARY

According to an aspect of the embodiments of the present disclosure, an authorization management method is provided. The method is applicable to a mobile terminal. A display screen of the mobile terminal is a bendable display screen and the display screen simultaneously displays an active authorization application and a passive authorization application. The method includes:

monitoring whether the display screen is bent;

in a case that it is monitored that the display screen is bent, sending a first authorization confirmation instruction to the active authorization application such that the active authorization application provides an authorized account for the passive authorization application, and the passive authorization application acquires the authorized account from the active authorization application and performs a login through the account.

In some embodiments, the display screen simultaneously displays the active authorization application and the passive authorization application includes: in a case that the display screen is bent in a vertical screen, dividing the display screen into a first screen area and a second screen area based on a bending position, displaying the active authorization application in the first screen area, and displaying the passive authorization application in the second screen area;

the display screen is bent through the following method: folding a screen corresponding to the first screen area of the display screen to a screen corresponding to the second screen area of the display screen, a folding angle being within a preset range.

In some embodiments, before monitoring whether the display screen is bent, the method further includes: displaying authorization rights of the active authorization application; acquiring at least one of the authorization rights of the active authorization application, selected by a user;

sending the first authorization confirmation instruction to the active authorization application such that the active authorization application provides the authorized account for the passive authorization application includes: sending the first authorization confirmation instruction and at least one acquired authorization right to the active authorization application such that the active authorization application provides the authorized account for the passive authorization application according to the first authorization confirmation instruction, and setting an access right of the authorized account according to the authorization right.

In some embodiments, before monitoring whether the display screen is bent, the method further includes: acquiring user authentication information; determining whether the user authentication information matches preset user authentication information, and if the user authentication information matches preset user authentication information, performing a step of monitoring whether the display screen is bent.

In some embodiments, the user authentication information includes at least one of a user fingerprint, a user voice and a user image.

According to another aspect of the embodiments of the present disclosure, an authorization management apparatus is provided. The apparatus is applicable to a mobile terminal. A display screen of the mobile terminal is a bendable display screen and the display screen simultaneously displays an active authorization disclosure and a passive authorization disclosure. The apparatus includes:

a monitoring component, configured to monitor whether the display screen is bent; and a processing component, configured to send, in a case that it is monitored that the display screen is bent, a first authorization confirmation instruction to the active authorization application such that the active authorization application provides an authorized account for the passive authorization application, and the passive authorization application acquires the authorized account from the active authorization application and performs a login through the account.

In some embodiments, the display screen simultaneously displaying the active authorization application and the passive authorization application includes: in a case that the display screen is bent in a vertical screen, dividing the display screen into a first screen area and a second screen area based on a bending position, displaying the active authorization application in the first screen area, and displaying the passive authorization application in the second screen area;

the display screen is bent through the following method: folding a screen corresponding to the first screen area of the display screen to a screen corresponding to the second screen area of the display screen, a folding angle being within a preset range.

In some embodiments, the apparatus further includes: a display component, configured to display authorization rights of the active authorization application before monitoring whether the display screen is bent; and a first acquisition component, configured to acquire an authorization right of the active authorization application, selected by a user;

the processing component is specifically configured to send, in the case that it is monitored that the display screen is bent, the first authorization confirmation instruction and at least one acquired authorization right to the active authorization application such that the active authorization application provides the authorized account for the passive authorization application according to the first authorization confirmation instruction, and set an access right of the authorized account according to the authorization right.

In some embodiments, the apparatus includes:

a second acquisition component, configured to acquire user authentication information before monitoring whether the display screen is bent; and a determining component, configured to determine whether the user authentication information matches preset user authentication information, and if the user authentication information matches preset user authentication information, perform the step of monitoring whether the display screen is bent.

In some embodiments, the user authentication information includes at least one of a user fingerprint, a user voice and a user image.

According to another aspect of the embodiments of the present disclosure, a mobile terminal is provided, which includes: at least one processor; and a memory communicatively connected to the at least one processor, wherein the memory stores an instruction executable by the at least one processor, and the instruction is executed by the at least one processor such that the at least one processor performs the method as mentioned above.

BRIEF DESCRIPTION OF THE DRAWINGS

The one or more embodiments are exemplified by the pictures in the corresponding accompanying drawings, and the exemplary descriptions do not constitute a limitation to the embodiments. Elements in the drawings having the same reference numerals are denoted by like elements, and unless otherwise stated, the figures in the drawings do not constitute a proportional limitation.

DETAILED DESCRIPTION OF THE EMBODIMENTS

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

It is to be noted that the following is a description of some of the various possible embodiments of the present disclosure, which are intended to provide a basic understanding of the present disclosure and are not intended to confirm key or critical elements of the present disclosure or the scope of the claimed. It is to be understood that according to the technical solutions of the present disclosure, those of ordinary skill in the art can propose other implementation modes that are interchangeable without departing from the spirit of the present disclosure. Therefore, the following specific embodiments and the accompanying drawings are merely illustrative of the technical solutions of the present disclosure, and are not to be construed as defining or limiting the scope of the present disclosure.

In order to facilitate a reader to better understand the present disclosure, the operation environment of the present disclosure will be described before describing the inventive concept of the present disclosure. The authorization management method and apparatus provided by the embodiments of the present disclosure are all applied to a mobile terminal. The mobile terminal 10 includes: a smart phone, a notebook computer, a Personal Digital Assistant (PDA), a tablet computer, a smart watch, an e-book, and the like.

Figure 1:
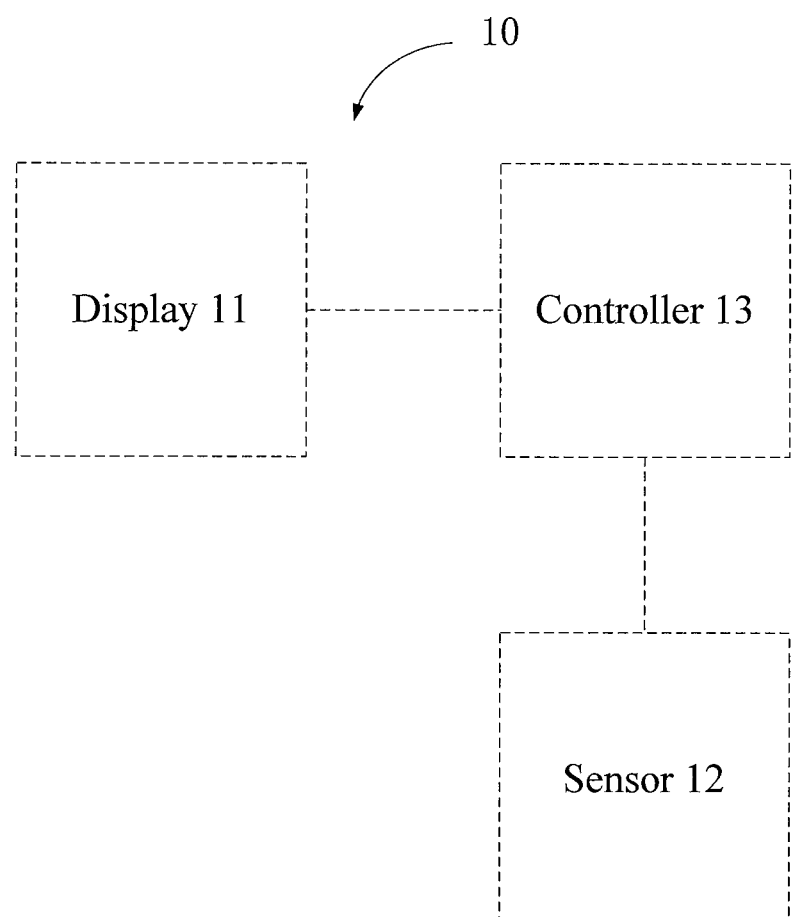
FIG. 1 is a structural schematic of an operation environment according to various embodiments of the present disclosure.

As shown in FIG. 1, the mobile terminal 10 includes a display 11, a sensor 12 and a controller 13. The controller 13 is connected to the display 11 and the sensor 12, respectively.

The display 11 can be any type of flexible display, such as, a Flexible Organic Light-Emitting Diode (FOLED), a Flexible Liquid Crystal Display (FLCD), a Flexible Electro Phoretic Display (FEPD), and so on.

The display 11 is configured with a flexible display panel and a touch sensor disposed under the flexible display panel. The touch sensor can be configured to convert a pressure applied to a particular portion of the flexible display panel or a change in capacitance generated at a particular portion of the flexible display panel to an electrical input signal. The touch sensor can be configured to detect not only a position of touch and an area of touch but also the pressure of touch.

In a case that there is a touch input on the touch sensor, a signal (or multiple signals) corresponding thereto is sent to the controller 13. The controller 13 processes the signal (or the signals) and then sends corresponding data to the controller 13. Thus, the controller 13 can determine which area of the flexible display panel is touched.

In a case that an external force is applied to the display 11, the display 11 is deformed to bend to a certain threshold angle, and can also work normally.

Figure 1A:
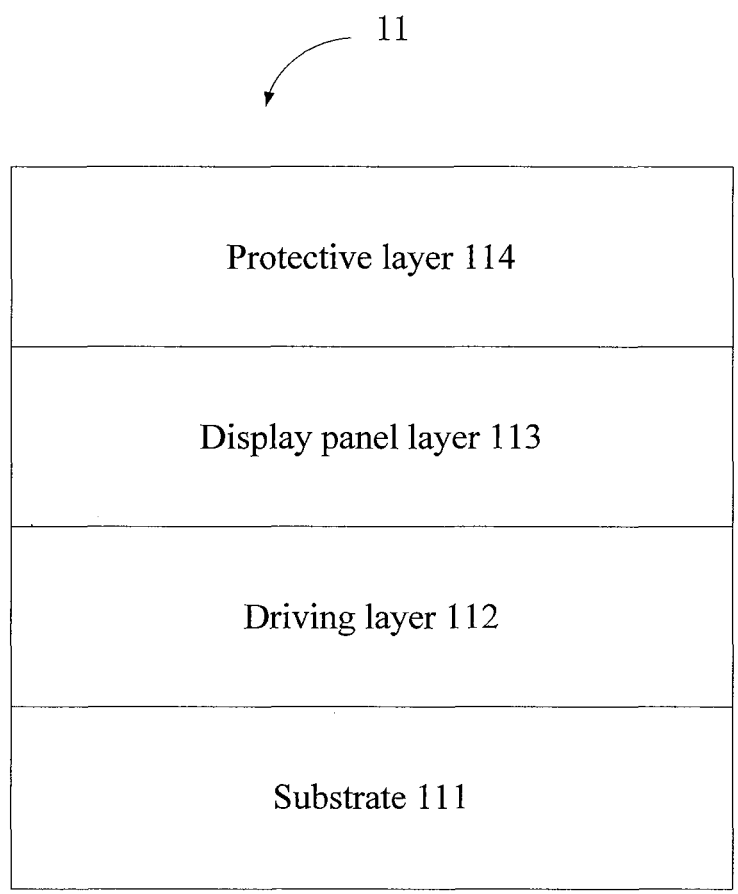
FIG. 1A is a structural schematic of a display 11 in the operation environment according to some embodiments of the present disclosure.

In some embodiments, as shown in FIG. 1A, the display 11 includes a substrate 111, a driving layer 112, a display panel layer 113, and a protective layer 114. The driving layer 112 is disposed between the substrate 111 and the display panel layer 113, and the protective layer 114 is disposed on the display panel layer 113.

The substrate 111 can be made of the following materials: plastic, metal foil, ultra-thin glass, paper substrate, biocomposite film substrate, and the like. A plastic substrate has a structure for processing a shield coated on both sides of a base film. The base film can be implemented by resin such as polyimide (PI), polycarbonate (PC), polyethylene glycol terephthalate (PET), polyethersulfone (PES), polyethylene film (PEN), or fiber reinforced plastic (FRP). The shield is on the opposite side of the base film, and an organic film or an inorganic film can be used to maintain flexibility.

The driving layer 112 is provided with a driver for driving the display panel layer 113. The driver applies a driving voltage to multiple pixel switches disposed on the display panel layer 113 to control a working state of each pixel, where the pixel switch can be a thin film transistor (TFT), a low temperature polysilicon thin film transistor, an organic thin film transistor, and the like.

The display panel layer 113 can include an organic illuminant including multiple pixel units and electrode layers covering two sides of the organic illuminant respectively. The driving layer 112 can include multiple transistors corresponding to the pixel units of the display panel layer 113. The controller 13 applies an electrical signal to a gate of each transistor to enable the pixel unit connected to the transistor to emit light, thereby causing the display panel layer 13 to display an image.

The protective layer 114 is configured to protect the display panel layer 113. For example, the protective layer 114 may include substances such as ZrO, Ce02, Th02. The protective layer 114 can be formed as a transparent film to cover the entire surface of the display panel layer 113.

The sensor 12 is configured to detect the curvature of the display 11, and the sensors 12 may be partially or completely disposed on the display 11 along a preset direction according to business requirements, and thus the sensors 12 can partially or completely detect the position of a bending area, a bending radius, a bending angle, and the like of the display 11. Further, bending data detected by the sensor 12 is sent to the controller 13 to cause the controller 13 to take corresponding control logic.

Figure 1B:
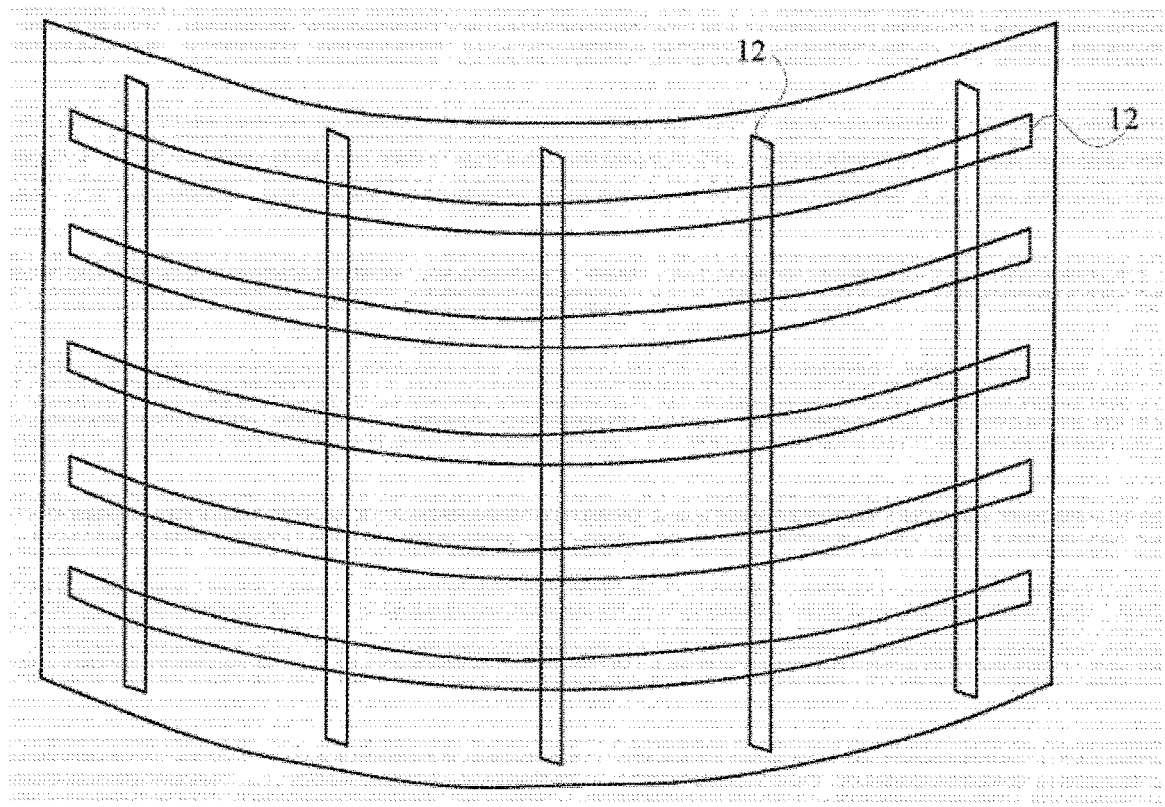
FIG. 1B is a schematic view of position of a sensor 12 in an operation environment according to some embodiments of the present disclosure.

As shown in FIG. 1B, the mobile terminal 10 includes multiple sensors 12, and in a longitudinal direction, the sensors 12 are sequentially arranged in a first direction. In a lateral direction, the sensors 12 are sequentially arranged in a second direction, and each sensor is regularly arranged at a preset distance.

In a case that an external force applies pressure to the display 11 to bend the display 11, a bending area can be identified according to a position of the sensor with pressure change. Each sensor 12 can be a resistive sensor or a microfiber sensor.

In some embodiments, the sensor 12 can also be an acceleration sensor, a gravity sensor, a gyroscope, and the like.

The controller 13 is configured to complete various control logics of the mobile terminal, which may be a general purpose processor, a digital signal processor (DSP), an application specific integrated circuit (ASIC), a field programmable gate array (FPGA), a single chip microcomputer, and an acorn RISC machine (ARM) or other programmable logic devices, discrete gates or transistor logics, discrete hardware components, or any combination of these components. Also, the controller 13 can be any conventional processor, micro-controller or state machine. The controller 13 can also be implemented as a combination of computing devices, e.g., a combination of a DSP and a microprocessor, multiple microprocessors, one or more microprocessors in conjunction with a DSP core, or any other such configuration.

Figure 1C:
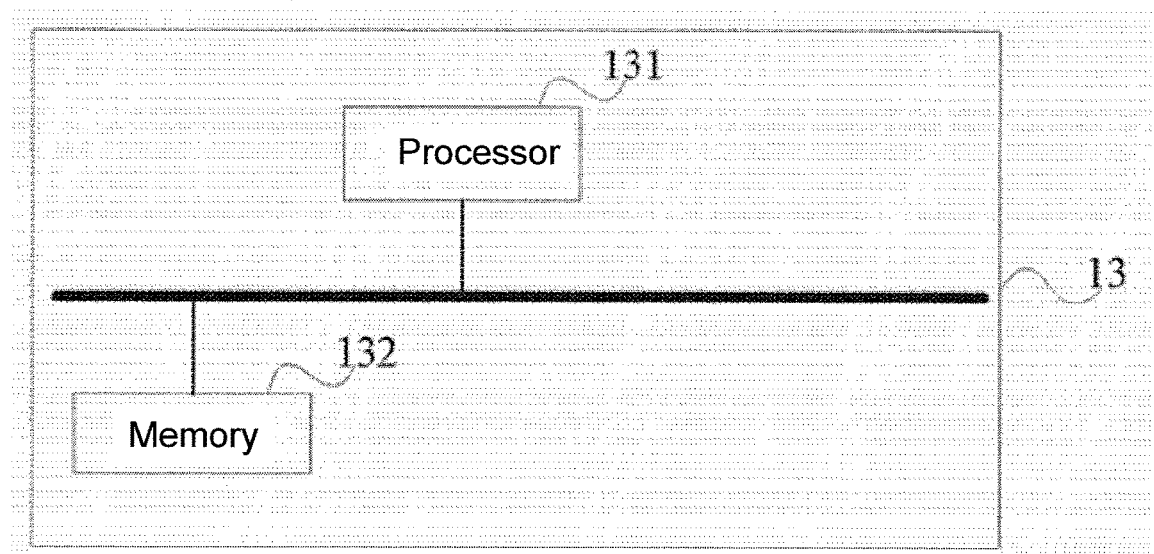
FIG. 1C is a structural schematic of a mobile terminal in an operation environment according to some embodiments of the present disclosure.

In some embodiments, as shown in FIG. 1C, the controller 13 includes: at least one processor 131 and a memory 132 communicatively connected to the at least one processor 131, in FIG. 1C, one processor 131 is taken as an example. The processor 131 and the memory 132 may be connected by a bus or other means, as exemplified by a bus connection in FIG. 1C.

The memory 132 stores an instruction executable by the at least one processor, and the instruction is executed by the at least one processor such that the at least one processor 131 performs control logics for the following authorization management method.

The authorization management method and apparatus provided in the following embodiments are both applied to the mobile terminal, and the authorization management method and apparatus are described in detail below in conjunction with the mobile terminal.

Embodiment 1

Figure 2:
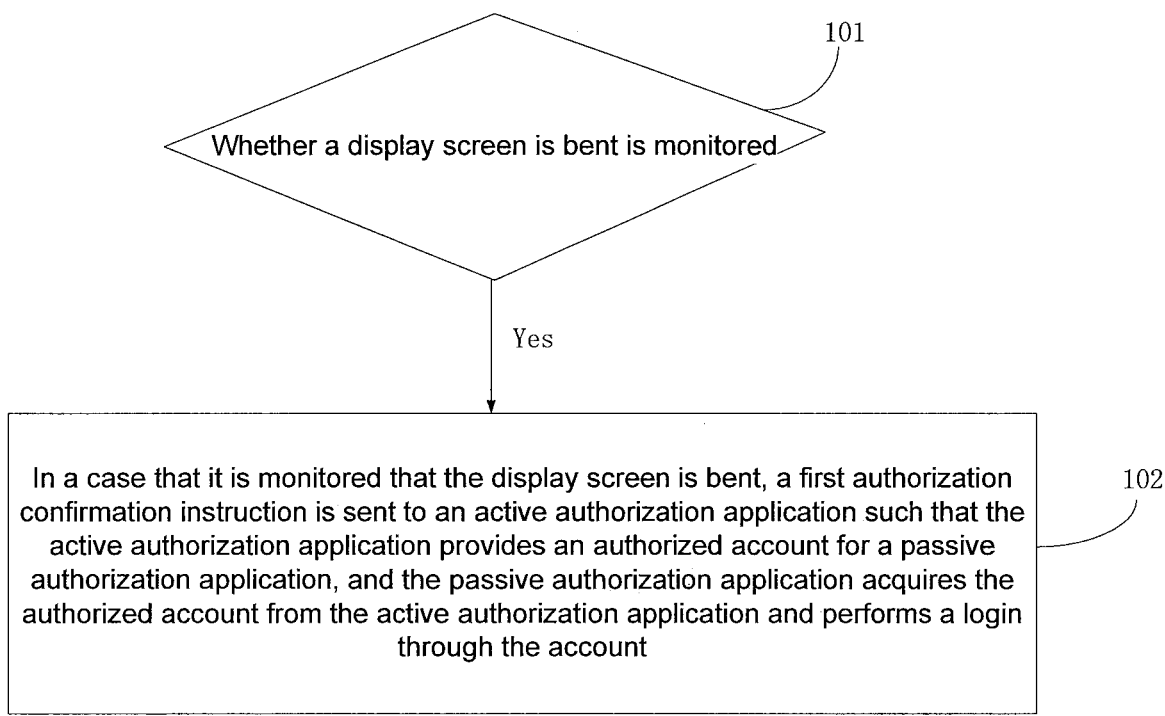
FIG. 2 is a flowchart of an authorization management method according to Embodiment 1 of the present disclosure.

Refer to FIG. 2. FIG. 2 is a flowchart of an authorization management method according to Embodiment 1 of the present disclosure. As shown in FIG. 2, the method includes:

step 101: whether a display screen is bent is monitored;

step 102: in a case that it is monitored that the display screen is bent, a first authorization confirmation instruction is sent to an active authorization application such that the active authorization application provides an authorized account for a passive authorization application, and the passive authorization application acquires the authorized account from the active authorization application and performs a login through the account.

In the present embodiment, the method is applicable to a mobile terminal. The display screen of the mobile terminal is a bendable display screen and the display screen simultaneously displays the active authorization application and the passive authorization application.

The active authorization application refers to an application that can authorize an account that is logged in and information associated with the account or access rights associated with the account to be used by other applications. The passive authorization application refers to an application that receives relevant information granted by the active authorization application.

Under normal circumstances, the active authorization application has its own account system, and its account system is large, stable and credible, such as QQ, WeChat and Weibo. The passive authorization application usually does not have its own account system, or the number of account systems is not large enough. In order to enhance user stickiness and improve the user experience, the passive authorization application often sends a connection request to the active authorization application when a user accesses the passive authorization application, so as to acquire an account authorization from the active authorization application.

Figure 3:
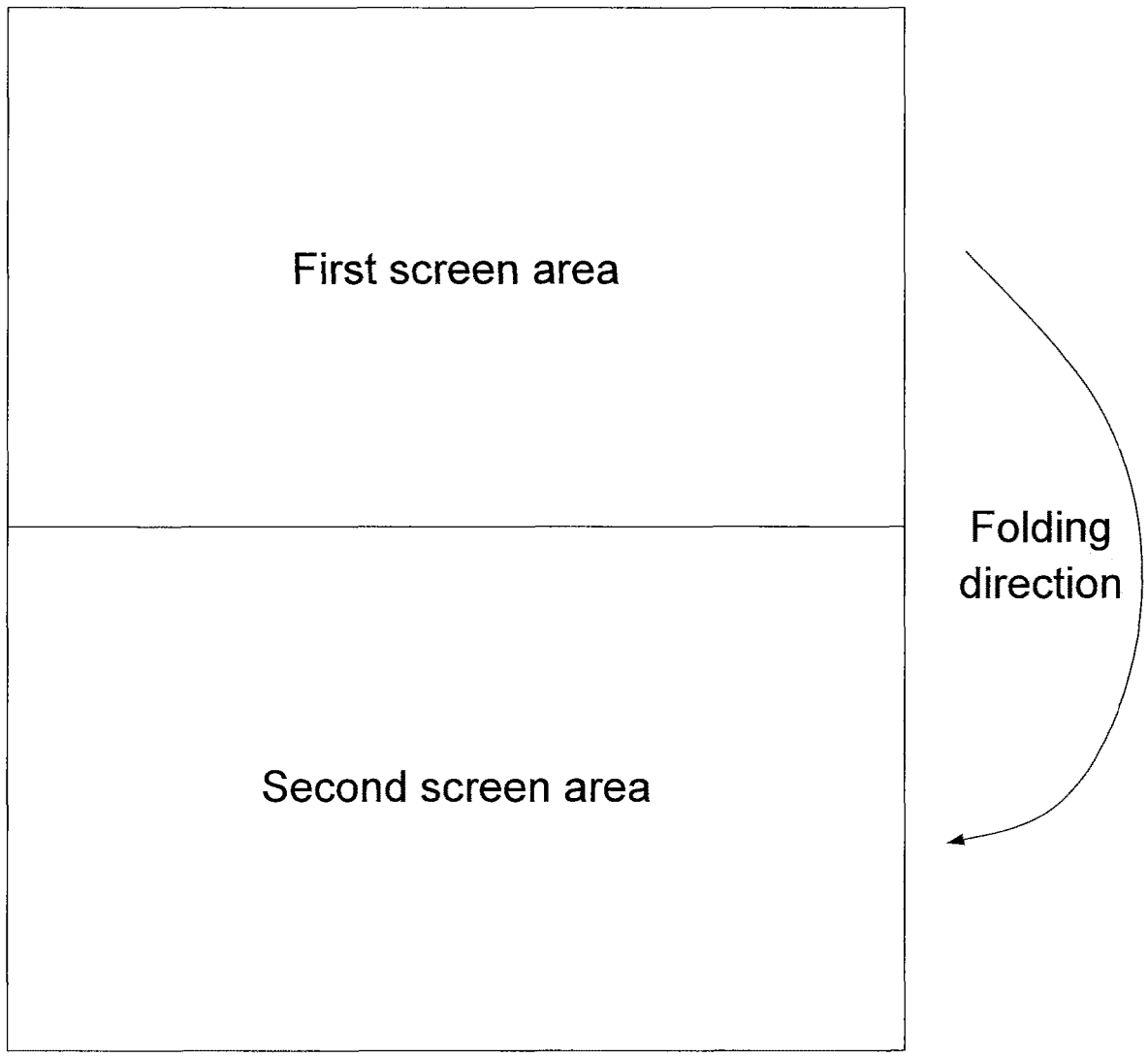
FIG. 3 is a schematic diagram of a display screen of a mobile terminal in an authorization management method according to Embodiment 1 of the present disclosure.

The display screen simultaneously displaying the active authorization application and the passive authorization application includes: in a case that the display screen is bent in a vertical screen, dividing the display screen into a first screen area and a second screen area based on a bending position, displaying the active authorization application in the first screen area, and displaying the passive authorization application in the second screen area. For example, as shown in FIG. 3, the display screen is divided into two screen areas in this manner. The area of the first screen area and the second screen area may be the same or different, and the area of the first screen area and the area of the second screen area can be customized according to an attribute of the active authorization application and an attribute of the passive authorization application. For example, the passive authorization application is a camera application, and in order to better display an image, the area of the second screen area can be set to be larger than the area of the first screen area.

After the display screen is divided into the above two screen areas, bending the display screen includes: folding a screen corresponding to the first screen area of the display screen to a screen corresponding to the second screen area of the display screen, a folding angle being within a preset range. Here, an emphasis is on a fold between the screens, of course, it can also be a fold between reverse sides of the screens to trigger the authorization. In addition, by defining a folding angle range, triggering the authorization by misoperation can be prevented effectively. A preset angle range can be customized according to personal preference, or can be defined by a system at the factory. If sending of the first authorization confirmation instruction to the active authorization application is triggered only in a case that the folding angle is within the preset range, the folding angle of the display screen can be detected by laterally or longitudinally arranging a bending sensor on the mobile terminal, or the folding angle can also be detected by a gyroscope or other types of sensors.

In the present embodiment, an authorization process between the active authorization application and the passive authorization application can be completed based on an open authorization (OAuth) technology. OAuth defines a secure, open, and simple standard for an authorization of user resources. A third party can obtain a user's authorization information without knowing the user's account and password, and the process is secure and credible. For a detailed description of the OAuth technology, reference can be made to the conventional art, and details are not described herein again.

In the present embodiment, the mobile terminal is provided with at least one sensor, and a processor provided on the mobile terminal monitors whether the display screen is bent according to the output of the at least one sensor. If the display screen is bent, the first authorization confirmation instruction is sent to the active authorization application, and a server of the active authorization application performs an account authorization on the passive authorization application according to the first authorization confirmation instruction, which mainly enables the passive authorization application to log in according to the authorized account. This authorization process may be implemented through a predefined account authorization common interface. The account authorization common interface refers to a unified interface provided by a mobile terminal system for the account authorization between applications, an application to be subjected to the account authorization performs an account authorization process between applications through the interface, and an application needing the account authorization needs to implement the interface uniformly to complete various operations of the account authorization process.

The embodiment of the present disclosure provides an authorization management method. According to the method, it is monitored whether a display screen is bent, and in a case that the display screen is bent, the first authorization confirmation instruction is sent to the active authorization application, so that the passive authorization application can acquire an account authorized by the active authorization application and can perform the login through the account. According to the embodiment, operations of triggering authorization are simplified, convenience is brought to operations of a user, and user experience is improved.

Embodiment 2

Figure 4:
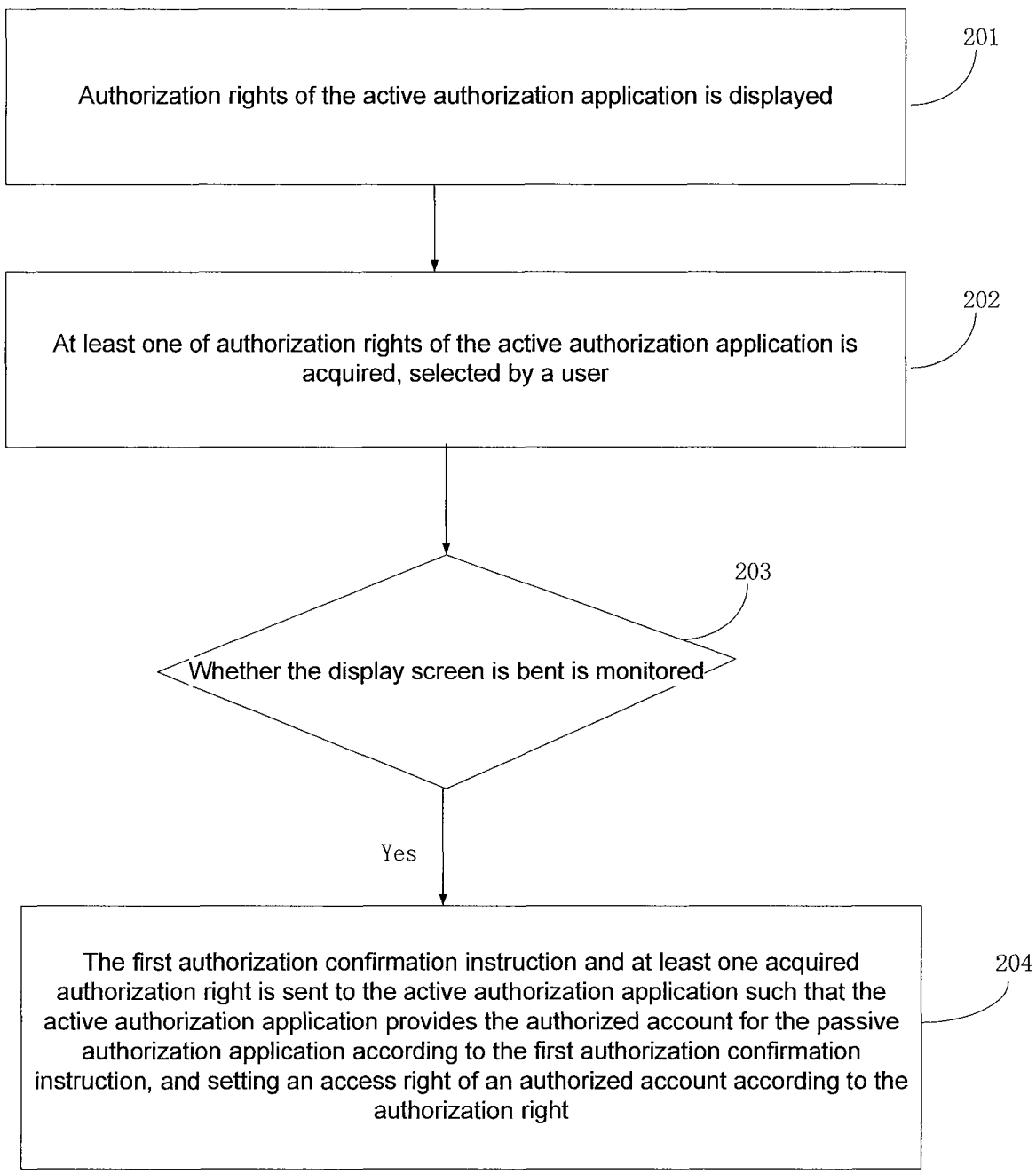
FIG. 4 is a flowchart of an authorization management method according to Embodiment 2 of the present disclosure.

Refer to FIG. 4. FIG. 4 is a flowchart of an authorization management method according to Embodiment 2 of the present disclosure. The method is applicable to a mobile terminal. A display screen of the mobile terminal is a bendable display screen and the display screen simultaneously displays an active authorization application and a passive authorization application. As shown in FIG. 4, the method includes:

step 201: authorization rights of the active authorization application is displayed;

step 202: at least one of authorization rights of the active authorization application is acquired, selected by a user;

step 203: whether the display screen is bent is monitored;

step 204: the first authorization confirmation instruction and at least one acquired authorization right is sent to the active authorization application such that the active authorization application provides the authorized account for the passive authorization application according to the first authorization confirmation instruction, and setting an access right of an authorized account according to the authorization right.

The main difference between the present embodiment and Embodiment 1 is that the active authorization application sets access rights of the authorized account in addition to authorizing the login account to the passive authorization application.

In the present embodiment, all options that can be authorized by the active authorization application can be displayed on the display screen, a user selects an option that can be authorized, and after the mobile terminal receives the authorization right selected by the user, in the case that it is monitored that the display screen is bent, the first authorization confirmation instruction and at least one acquired authorization right are sent to the active authorization application, so that the passive authorization application can log in to the authorized account and can access the authorization right when using the authorized account.

The displayed authorization rights are determined by the active authorization application, and the user can accept global configuration or can customize. In some embodiments, the passive authorization application can also set access rights to an account of the active authorization application.

The embodiment of the present application provides the authorization management method. According to the method, it is monitored whether a display screen is bent, the access right to the user account is set, and in a case that the display screen is bent, the first authorization confirmation instruction and the authorization right are sent to the active authorization application, so that the passive authorization application can acquire an account authorized by the active authorization application, can perform the login through the account, and can acquire the access right to the account. On the one hand, the embodiment simplifies operations of triggering authorization, brings convenience to operations of the user and improves user experience, and on the other hand, the safety of the authorized account can be effectively guaranteed by setting the authorization right.

Embodiment 3

Figure 5:
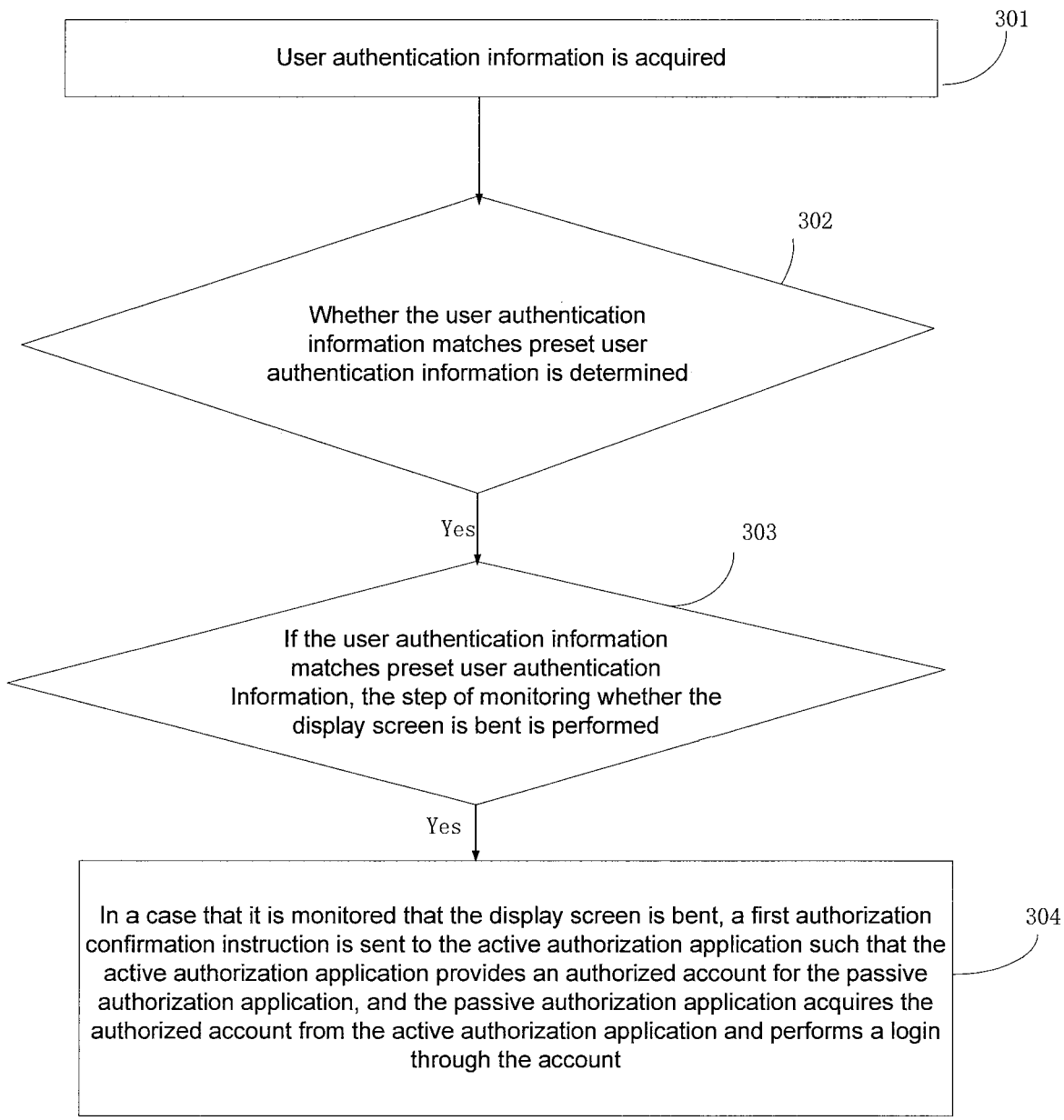
FIG. 5 is a flowchart of an authorization management method according to Embodiment 3 of the present disclosure.

Refer to FIG. 5. FIG. 5 is a flowchart of an authorization management method according to Embodiment 3 of the present application. The method is applicable to a mobile terminal. A display screen of the mobile terminal is a bendable display screen and the display screen simultaneously displays an active authorization application and a passive authorization application. As shown in FIG. 5, the method includes:

step 301: user authentication information is acquired;

step 302: whether the user authentication information matches preset user authentication information is determined;

step 303: If the user authentication information matches preset user authentication information, the step of monitoring whether the display screen is bent is performed;

step 304: in a case that it is monitored that the display screen is bent, a first authorization confirmation instruction is sent to the active authorization application such that the active authorization application provides an authorized account for the passive authorization application, and the passive authorization application acquires the authorized account from the active authorization application and performs a login through the account.

The user information includes a user fingerprint, a user voice and a user image.

The user authentication information can be acquired by technologies such as fingerprint recognition, voice recognition, and image recognition. After user authentication information is acquired, the information is matched with preset user authentication information to determine whether a current user is a mobile terminal user. If the two pieces of information match, it indicates that the current user is the mobile terminal user, otherwise, the current user is not a mobile terminal user.

After it is detected that the current user is the mobile terminal user, it is further determined whether the authorization is triggered by monitoring whether the display screen is bent. It is to be noted that the related operations in Embodiment 2 can also be performed before the authorization is triggered to set rights of the authorized account.

In the present embodiment, based on the above embodiments, the mobile terminal user detection steps are further increased to prevent a non-mobile terminal user from performing an illegal authorization operation, thereby not only simplifying the authorization operation steps and facilitating the user operations, but also improving the safety of authorization and avoiding illegal authorization.

Embodiment 4

Figure 6:
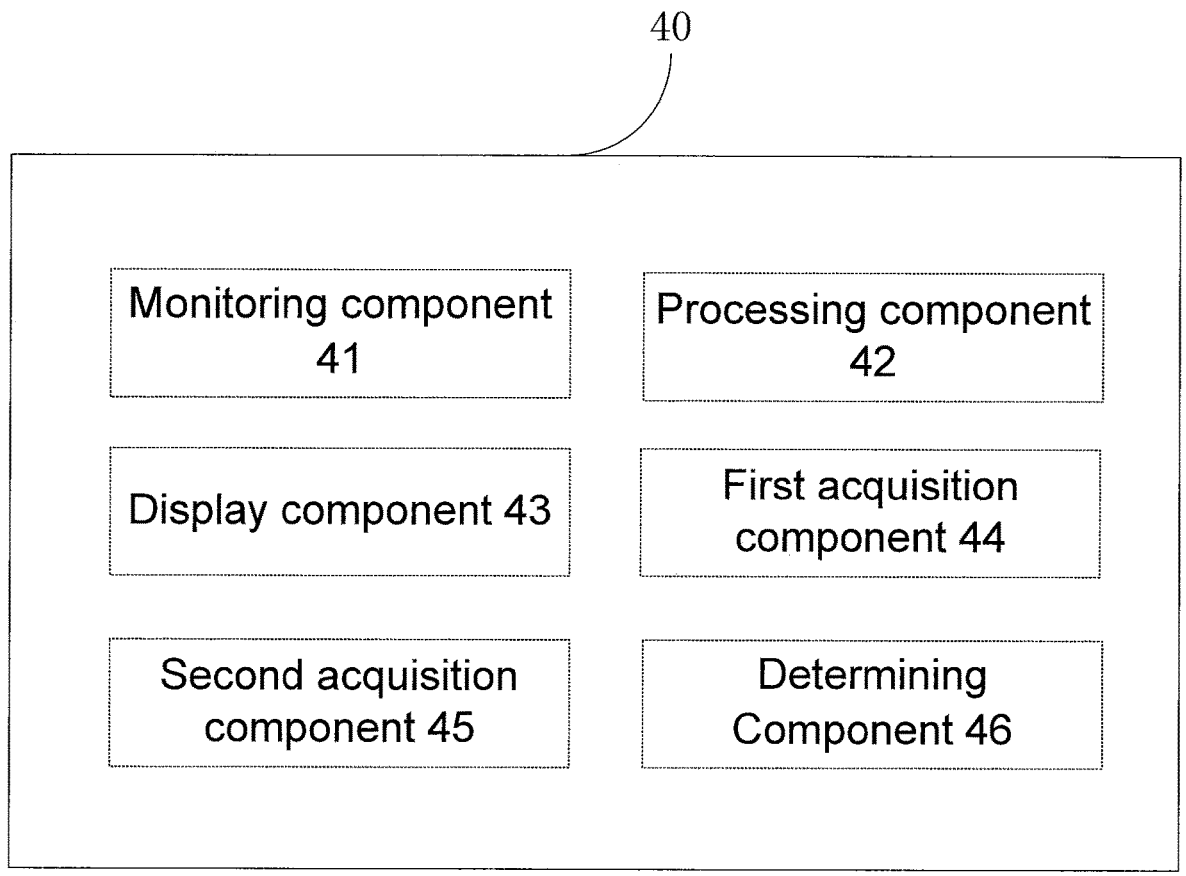
FIG. 6 is a structural schematic of an authorization management apparatus according to Embodiment 4 of the present disclosure.

Please refer to FIG. 6. FIG. 6 is a structural schematic diagram of an authorization management apparatus according to Embodiment 4 of the present disclosure. The apparatus 40 is applicable to a mobile terminal. A display screen of the mobile terminal is a bendable display screen and the display screen simultaneously displays an active authorization application and a passive authorization application. The apparatus 40 includes a monitoring component 41 and a processing component 42.

The monitoring component 41 is configured to monitor whether the display screen is bent. The processing component 42 is configured to send, in a case that it is monitored that the display screen is bent, a first authorization confirmation instruction to the active authorization application such that the active authorization application performs an account authorization on the passive authorization application, and the passive authorization application acquires the authorized account from the active authorization application and performs a login through the account.

The step of simultaneously displaying, by the display screen, an active authorization application and a passive authorization application includes:

in a case that the display screen is bent in a vertical screen, dividing the display screen into a first screen area and a second screen area based on a bending position, displaying the active authorization application in the first screen area, and displaying the passive authorization application in the second screen area; bending the display screen includes: folding a screen corresponding to the first screen area of the display screen to a screen corresponding to the second screen area of the display screen, a folding angle being within a preset range.

Further, also refer to FIG. 6, the apparatus 40 further includes a display component 43 and a first acquisition component 44. The display component 43 and the first acquisition component 44 perform corresponding operations before the monitoring component 41 performs corresponding operations. Specifically, the display component 43 is configured to display authorization rights of the active authorization application. The first acquisition component 44 is configured to acquire at least one of the authorization rights of the active authorization application, selected by a user. At this time, the processing component 42 is specifically configured to send, in the case that it is monitored that the display screen is bent, the first authorization confirmation instruction and at least one acquired authorization right to the active authorization application such that the active authorization application provides the authorized account for the passive authorization application according to the first authorization confirmation instruction, and set an access right of the authorized account according to the authorization right.

Further, also refer to FIG. 6, the apparatus 40 further includes a second acquisition component 45 and a determining component 46. The second acquisition component 45 and the determining component 46 perform corresponding operations before the monitoring component 41 performs corresponding operations. Specifically, the second acquisition component 45 is configured to acquire user authentication information. The determining component 46 is configured to determine whether the user authentication information matches preset user authentication information, and if the user authentication information matches preset user authentication information, perform the step of monitoring whether the display screen is bent.

The user authentication information includes at least one of a user fingerprint, a user voice and a user image.

It is to be noted that since information interaction, the execution process, and the like between the components in the authorization management apparatus in the embodiment of the present disclosure are based on the same concept as the method embodiment of the present disclosure, the specific content is also applicable to the authorization management apparatus. The various components in the embodiments of the present disclosure can be implemented as separate hardware or software, and a combination of functions of each unit may be implemented using separate hardware or software as needed.

In the embodiment of the present disclosure, it is determined whether a current user is a mobile terminal user by checking user authentication information, it is determined when to trigger authorization by monitoring the bending of the display screen, and in the case that the display screen is bent, the first authorization confirmation instruction is sent to the active authorization application, so that the passive authorization application can acquire an account authorized by the active authorization application and can perform a login through the account. In addition, the authorization right of the authorized account can also be set. According to the embodiment, on the one hand, an action of authorization confirmation is set as a simple screen bending action, so that operation steps in the authorization between different applications are simplified, and convenience is brought to operations of a user, and on the other hand, the safety of the authorized account is improved.

Embodiment 5

Embodiment 5 of the present disclosure provides a non-volatile computer-readable storage medium which stores computer-executable instructions that are executed by an electronic device to perform the authorization management method in any of the above method embodiments. For example, the above described method step 101 to step 102 in FIG. 2, method step 201 to step 204 in FIG. 4, and method step 301 to step 304 in FIG. 5 are performed, and components 41-46 in FIG. 6 are implemented.

Embodiment 6

Embodiment 6 of the present disclosure provides a computer program product, including a computing program stored on a non-volatile computer-readable storage medium, the computer program includes program instructions, and in a case that the program instructions are executed by a computer, the computer performs the authorization management method in any of the above method embodiments. For example, the above described method step 101 to step 102 in FIG. 2, method step 201 to step 204 in FIG. 4, and method step 301 to step 304 in FIG. 5 are performed, and components 41-46 in FIG. 6 are implemented.

The apparatus embodiments described above are merely illustrative, wherein the units described as separate components may or may not be physically separated, and the components displayed as units may or may not be physical units, which may be located in one place or distributed to multiple network units. Some or all of the components may be selected according to actual needs to achieve the purpose of the solution of the present embodiment.

Through the description of the above embodiments, those of ordinary skill in the art can clearly understand that each embodiment may be implemented by means of software plus a general hardware platform, and of course, may also be implemented through hardware. Those skilled in the art can understand that all or part of the processes in the above embodiments may be implemented by a computer program to instruct related hardware, and the program may be stored in a computer-readable storage medium. When the program is executed, the flow of each method embodiment as described above may be included. The storage medium may be a magnetic disk, an optical disk, a read-only memory (ROM), or a random access memory (RAM).

Finally, it is to be noted that the above embodiments are only used to illustrate the technical solutions of the present disclosure, and are not limited thereto. The technical features in the above embodiments or different embodiments may also be combined under the concept of the present disclosure, the steps may be implemented in any order, there are many other variations of different aspects of the present disclosure as described above, and for the sake of brevity, they are not provided in the details. Although the present disclosure has been described in detail with reference to the foregoing embodiments, those skilled in the art should understand that the technical solutions described in the foregoing embodiments can be modified, or some technical features can be equivalently replaced, but the modifications and replacements do not make the essence of the corresponding technical solutions depart from the scope of the technical solutions of various embodiments of the present disclosure.

What is claimed is:

1. An authorization management method, applicable to a mobile terminal, a display screen of the mobile terminal being a bendable display screen and the display screen simultaneously displaying an active authorization application and a passive authorization application, the method comprising:
   monitoring whether the display screen is bent; and
   in a case that it is monitored that the display screen is bent, sending a first authorization confirmation instruction to the active authorization application such that the active authorization application provides an authorized account for the passive authorization application, and the passive authorization application acquires the authorized account from the active authorization application and performs a login through the account.

2. The authorization management method of claim 1, wherein
   the display screen simultaneously displaying the active authorization application and the passive authorization application comprises: in a case that the display screen is bent in a vertical screen, dividing the display screen into a first screen area and a second screen area based on a bending position, displaying the active authorization application in the first screen area, and displaying the passive authorization application in the second screen area; and
   the display screen is bent through the following method: folding a screen corresponding to the first screen area of the display screen to a screen corresponding to the second screen area of the display screen, a folding angle being within a preset range.

3. The authorization management method of claim 2, wherein before monitoring whether the display screen is bent, the authorization management method further comprises:
   acquiring user authentication information; and
   determining whether the user authentication information matches preset user authentication information, and if the user authentication information matches preset user authentication information, performing a step of monitoring whether the display screen is bent.

4. A mobile terminal, comprising:
   at least one processor; and
   a memory communicatively connected to the at least one processor,
   wherein the memory stores an instruction executable by the at least one processor, and the instruction is executed by the at least one processor such that the at least one processor performs the authorization management method of claim 2.

5. The authorization management method of claim 1, wherein
before monitoring whether the display screen is bent, the authorization management method further comprises: displaying authorization rights of the active authorization application; and acquiring at least one of the authorization rights of the active authorization application, selected by a user;
sending the first authorization confirmation instruction to the active authorization application such that the active authorization application provides the authorized account for the passive authorization application comprises: sending the first authorization confirmation instruction and at least one acquired authorization right to the active authorization application such that the active authorization application provides the authorized account for the passive authorization application according to the first authorization confirmation instruction, and setting an access right of the authorized account according to the authorization right.

6. The authorization management method of claim 5, wherein before monitoring whether the display screen is bent, the authorization management method further comprises:
acquiring user authentication information; and
determining whether the user authentication information matches preset user authentication information, and if the user authentication information matches preset user authentication information, performing a step of monitoring whether the display screen is bent.

7. A mobile terminal, comprising:
at least one processor; and
a memory communicatively connected to the at least one processor,
wherein the memory stores an instruction executable by the at least one processor, and the instruction is executed by the at least one processor such that the at least one processor performs the authorization management method of claim 5.

8. The authorization management method of claim 1, wherein before monitoring whether the display screen is bent, the authorization management method further comprises:
acquiring user authentication information; and
determining whether the user authentication information matches preset user authentication information, and if the user authentication information matches preset user authentication information, performing a step of monitoring whether the display screen is bent.

9. The authorization management method of claim 8, wherein the user authentication information comprises at least one of a user fingerprint, a user voice and a user image.

10. A mobile terminal, comprising:
at least one processor; and
a memory communicatively connected to the at least one processor,
wherein the memory stores an instruction executable by the at least one processor, and the instruction is executed by the at least one processor such that the at least one processor performs the authorization management method of claim 9.

11. A mobile terminal, comprising:
at least one processor; and
a memory communicatively connected to the at least one processor,
wherein the memory stores an instruction executable by the at least one processor, and the instruction is executed by the at least one processor such that the at least one processor performs the authorization management method of claim 8.

12. A mobile terminal, comprising:
at least one processor; and
a memory communicatively connected to the at least one processor,
wherein the memory stores an instruction executable by the at least one processor, and the instruction is executed by the at least one processor such that the at least one processor performs the authorization management method of claim 1.

13. An authorization management apparatus, applicable to a mobile terminal, a display screen of the mobile terminal being a bendable display screen and the display screen simultaneously displaying an active authorization application and a passive authorization application, the authorization management apparatus comprising:
a monitoring component, configured to monitor whether the display screen is bent; and
a processing component, configured to send, in a case that it is monitored that the display screen is bent, a first authorization confirmation instruction to the active authorization application such that the active authorization application provides an authorized account for the passive authorization application, and the passive authorization application acquires the authorized account from the active authorization application and performs a login through the account.

14. The authorization management apparatus of claim 13, wherein
the display screen simultaneously displaying the active authorization application and the passive authorization application comprises: in a case that the display screen is bent in a vertical screen dividing the display screen into a first screen area and a second screen area based on a bending position, displaying the active authorization application in the first screen area, and displaying the passive authorization application in the second screen area; and
the display screen is bent through the following method: folding a screen corresponding to the first screen area of the display screen to a screen corresponding to the second screen area of the display screen, a folding angle being within a preset range.

15. The authorization management apparatus of claim 14, wherein before monitoring whether the display screen is bent, the authorization management apparatus further comprises:
a second acquisition component, configured to acquire user authentication information; and
a determining component, configured to determine whether the user authentication information matches preset user authentication information, and if the user authentication information matches preset user authentication information, perform the step of monitoring whether the display screen is bent.

16. The authorization management apparatus of claim 13, wherein
the authorization management apparatus further comprises: a display component, configured to display authorization rights of the active authorization application before monitoring whether the display screen is bent; and a first acquisition component, configured to acquire at least one of the authorization rights of the active authorization application, selected by a user;

the processing component is specifically configured to send, in the case that it is monitored that the display screen is bent, the first authorization confirmation instruction and at least one acquired authorization right to the active authorization application such that the active authorization application provides the authorized account for the passive authorization application according to the first authorization confirmation instruction, and set an access right of the authorized account according to the authorization right.

17. The authorization management apparatus of claim 16, wherein before monitoring whether the display screen is bent, the authorization management apparatus further comprises:
   a second acquisition component, configured to acquire user authentication information; and
   a determining component, configured to determine whether the user authentication information matches preset user authentication information, and if the user authentication information matches preset user authentication information, perform the step of monitoring whether the display screen is bent.

18. The authorization management apparatus of claim 13, wherein the authorization management apparatus further comprises:
   a second acquisition component, configured to acquire user authentication information before monitoring whether the display screen is bent; and
   a determining component, configured to determine whether the user authentication information matches preset user authentication information, and if the user authentication information matches preset user authentication information, perform the step of monitoring whether the display screen is bent.

19. The authorization management apparatus of claim 18, wherein the user authentication information comprises at least one of a user fingerprint, a user voice and a user image.

* * * * *